April 20, 1965  H. R. PLUMMER ETAL  3,178,739
DOUBLE FLOAT TOOL HOLDER
Filed Sept. 5, 1961  3 Sheets-Sheet 1
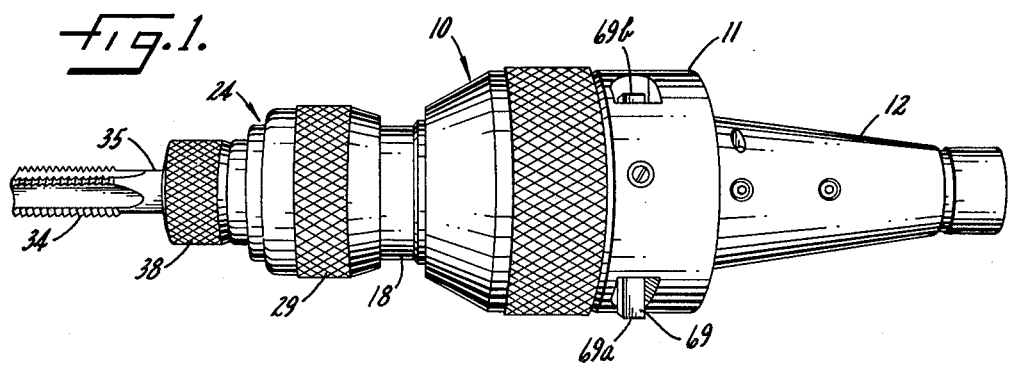
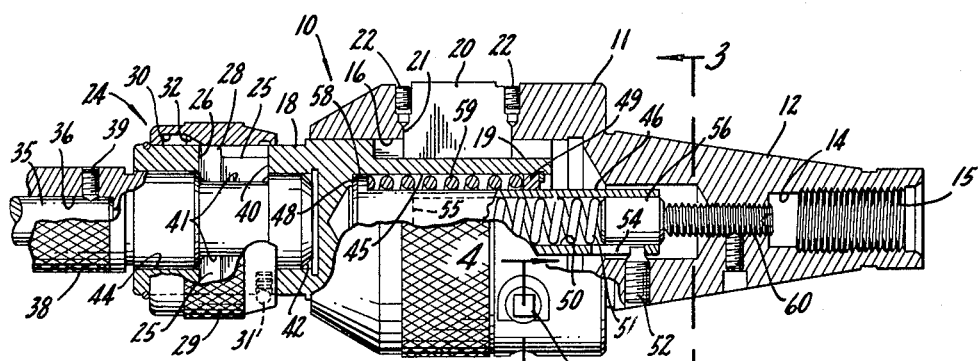
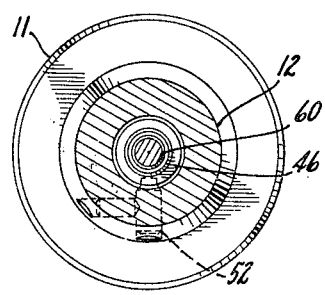
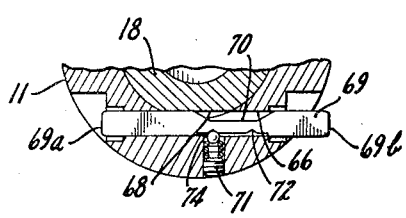
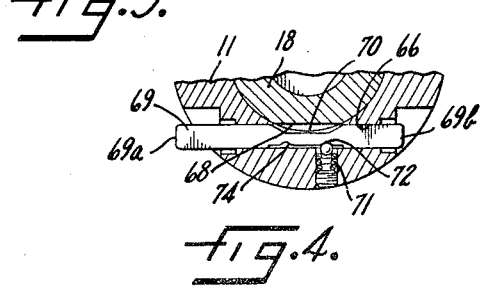
INVENTORS.
HARVEY R. PLUMMER
WILLIAM M. RITTER
BY Wolfe, Hubbard,
Voit & Osann
ATTORNEYS.

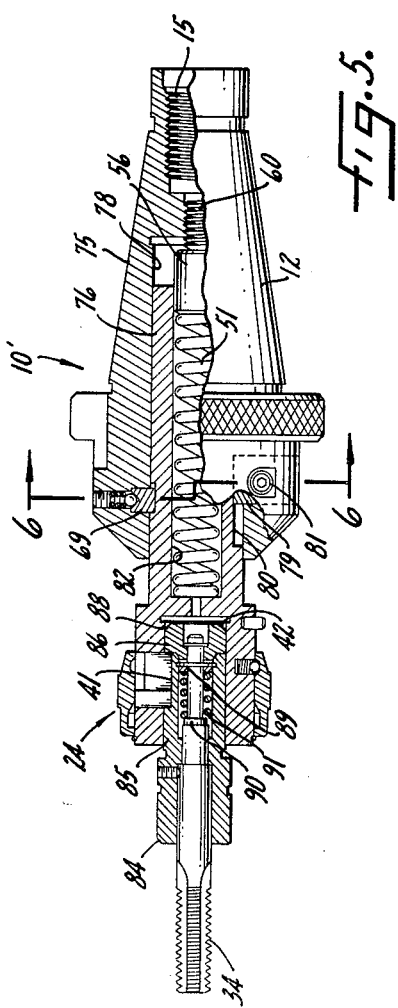

INVENTORS.
HARVEY R. PLUMMER
WILLIAM M. RITTER
BY Wolfe, Hubbard,
Voit & Osann
ATTORNEYS.

United States Patent Office 3,178,739
Patented Apr. 20, 1965

3,178,739
DOUBLE FLOAT TOOL HOLDER
Harvey R. Plummer and William M. Ritter, Fond du Lac, Wis., assignors to Giddings & Lewis Machine Tool Company, Fond du Lac, Wis., a corporation of Wisconsin
Filed Sept. 5, 1961, Ser. No. 136,002
18 Claims. (Cl. 10—129)

The present invention relates to a tool holder, and more particularly, to a tool holder suitable for use with automatic machinery in which the feed rate of the machinery driving element differs from the feed rate or lead rate of the tool into the workpiece.

In the field of industrial machinery there has been a continually increasing trend towards greater automation. This trend has developed to the point where often the diverse machining steps to be performed on a workpiece, or a series of workpieces, are programmed and sequentially performed by automatic power machines responsive to command signals originating from a master control. For example, a particular workpiece may be sequentially formed, drilled and tapped by power machines operating under numerical control from a punched tape or the like. One inherent disadvantage resulting from the use of such programmed automatic machinery is that the machines operate upon reception of a command signal without necessarily taking into account certain variables that might be encountered.

Merely by way of example, in tapping apparatus, it is desirable to provide for axial float of the tap relative to the driving spindle in order to compensate for differentials in spindle feed and tap lead. This has been accomplished by yieldably biasing the tapping tool to a neutral axial position relative to the spindle or tool holder, for example, with a pair of compression springs. At the same time, it is essential that the axial thrust or compressive force exerted by the tool against the workpiece be adjusted such that the tap will properly lead into the workpiece. Should the axial thrust exerted upon the tool be too great, it is more than likely that the hole which is to be threaded will be reamed out. Conversely, if the axial thrust is too small, the tap will not feed into the workpiece at all. Consequently, provision must be made for selectively varying the preload of the yieldable biasing mechanism. However, such alterations in preloading have heretofore resulted in shifting of the neutral axial position of the tap relative to the drive spindle. Such changes in the neutral position of the tap are not sensed by the automatic machinery, thus resulting in error in the depth to which the workpiece is tapped.

It is a general aim of the present invention to provide an improved tool holding device characterized by its ability to compensate for differentials between spindle feed rate and tool feed or lead rate.

Another object of the invention is to provide a highly versatile tool holder which may be used over a wide range of spindle feed-tool lead differentials, yet wherein the neutral position of the tool remains at a positive reference position relative to the drive spindle.

It is yet another object of the invention to provide a novel adjusting mechanism for varying the axial thrust exerted by the tool against a workpiece wherein the neutral position of the tool remains unchanged.

A further object of the invention is to provide a tap leader characterized by its ability to compensate for automatic machines in which the spindle feed and spindle rotation do not commence simultaneously. Such machines are subject to backlash due to the normal running clearances in the drive gearing.

In another of its aspects, it is an object of the invention to provide a novel locking mechanism for inhibiting axial float of the tool relative to the holder, thus allowing the holder to be used for drilling operations or the like.

A further object of the invention is to provide a highly versatile tool holder which may be readily adjusted for diverse machining operations, in some of which the drive spindle and the tool feed at the same rate while in others the feed rate of the drive spindle differs from the feed or lead rate of the tool.

These and other objects and advantages of the invention are obtained by the construction and arrangements shown as exemplary embodiments in the accompanying drawings in which:

FIGURE 1 is a pictorial elevation illustrating a tool holding device embodying the features of the present invention with the holder supporting a tapping tool;

FIG. 2 is an enlarged longitudinal view of the tool holding device shown in FIG. 1 with the body of the holder partially broken away to illustrate the internal arrangement of components in one exemplary form of the invention;

FIG. 3 is a sectional view taken substantially along the line 3—3 of FIG. 2;

FIG. 4 is a fragmentary sectional view taken substantially along the line 4—4 of FIG. 2 illustrating the novel locking mechanism of the present invention with the tool holder conditioned for a tapping operation;

FIG. 4a is a sectional view similar to FIG. 4 illustrating the tool holder with the locking mechanism conditioned for a drilling operation;

FIG. 5 is a longitudinal view, partially in section, of a modified form of tool holding device also embodying the features of the present invention;

FIG. 6 is a transverse section taken substantially along the line 6—6 of FIG. 5;

FIG. 7 is a fragmentary sectional view illustrating a modified form of adjusting mechanism that can be used with the tool holders shown in FIGS. 2 and 5;

Figure 8:
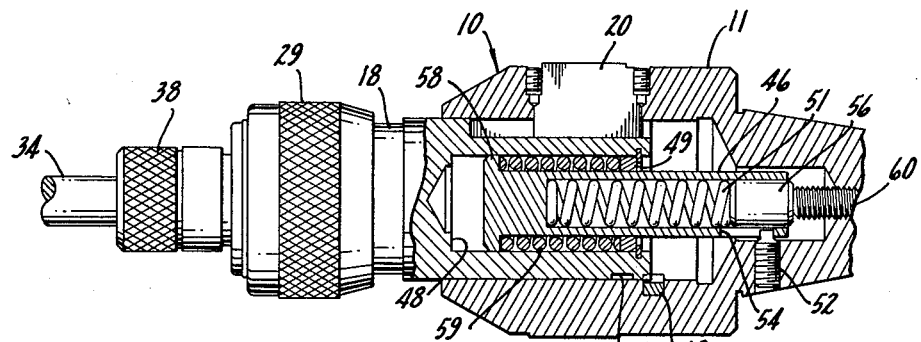
FIG. 8 is a fragmentary longtiudinal view of the tool holder shown in FIG. 2, partially in section, illustrating the relative positions of the components when the lead rate of the tool exceeds the feed rate of the machine tool spindle.

While the invention is susceptible of various modifications and alternatives, certain illustrative forms thereof have been shown in the drawings and will be described in detail below. It should be understood however that there is no intention to limit the invention to the specific forms disclosed. On the contrary, it is intended here to cover all modifications, alternatives and equivalents falling within the spirit and scope of the appended claims.

Referring first to FIGS. 1 and 2, there is illustrated a tool holding device, generally indicated at 10, embodying the features of the present invention and including a body member 11 having a rearwardly extending tapered shank 12 suitable for attachment to the spindle of a machine tool (not shown) in a conventional manner. To securely mount the tool holder on the machine tool spindle, the rearmost end of the shank 12 has formed therein a coaxial bore 14 having internal screw threads 15 positioned to be engaged by a draw bolt (not shown) in the machine tool spindle. The forward end of the body member 11 has formed therein an elongate coaxial bore 16 which slidably receives and contains the rearmost end of a generally cylindrical adaptor sleeve 18. In order to provide a drive connection between the telescopically mounted body member 11 and adaptor sleeve 18, the outer surface of the latter has formed therein an elongate longitudinal keyway slot 19 positioned to slidably receive the innermost end of a radial drive key 20. The drive key 20 extends through a radial slot 21 formed in the body member 11 and, in the exemplary form of the invention, is rigidly secured in place by a pair of radially disposed set screws 22. Thus, a rotatable drive connection is established from the machine tool spindle through the driving body member 11 and the drive key 20 to the driven adaptor sleeve 18.

To increase the versatility of the tool holding device and the speed with which diverse tools may be interchanged, the forward end of the adaptor sleeve 18 has fitted thereon a quick change chuck, generally indicated at 24, of the type described in detail in U.S. Patent No. 2,834,191 to G. Toothill. It should suffice for an understanding of the present invention to state that the quick change chuck 24 includes a pair of drive keys 25 which are respectively positioned in a pair of diametrically opposed tangential slots 26 formed in the forward end of the adaptor sleeve 18. Each drive key 25 has formed thereon an integral, outwardly extending, arcuate flange 28. A locking ring 29, having an annular internal recess 30 is slidably mounted on the sleeve 18 so as to overlie the drive keys 25 and is yieldably held in its forward locking position by means of a spring-loaded detent 31. The recess 30 in the locking ring 29 terminates in a tapered cam surface 32.

While the tool holding device 10 of the present invention may be used with a wide variety of tools, it is here shown and described in conjunction with a tapping tool 34 having a rearwardly extending shank 35 rigidly secured within a bore 36 formed in a collet 38 by means of a set screw 39. The collet 38 has formed therein a pair of diametrically opposed tangential slots 40 respectively defining a pair of drive flats 41. The rearmost end of the collet is tapered to define a cam surface 42.

To mount a tool (for example, the tap 34) in the holder 10, it will be readily apparent that it is merely necessary to slide the locking ring 29 rearwardly until the annular recess 30 formed therein overlies the flanges 28 formed on the drive keys 25. As the assembled tool 34 and collet 38 are inserted into the bore 44 formed in the forward end of the adaptor sleeve 18, the cam surface 42 on the collet engages the drive keys 25 and urges them radially outward, forcing the key flanges 28 into the annular recess 30 formed in the locking ring. When the drive keys 25 are registered with the slots 40 formed in the collet 38, the locking ring 29 is moved forwardly engaging the cam surface 32 with the flanges 28 and camming the drive keys 25 radially into the slots 40. Thus, a drive connection is established from the sleeve 18 to the collet 38 through the drive key 25 and the drive flats 41 formed on the collet. When it is desired to remove the tool 34 it is merely necessary to slide the locking ring 29 rearwardly and rotate the collet 38 slightly. As the collet is rotated, the drive flats 41 serve to cam the associated keys 25 radially outwardly and the collet is freed for extraction from the bore 44 in the adaptor sleeve 18.

In accordance with one of the important aspects of the present invention, provision is made for mounting the tool 34 in the holder 10 in a fixed positive neutral position, thus allowing the tool to be used with automatic programmed machinery under numerical control, yet wherein the tool 34 is free to float in either axial direction and where the axial thrust exerted by the tool against the workpiece may be varied to accommodate a wide range of differential feed rates between the tool 34 and the drive spindle. In the form of the invention illustrated in FIG. 2, this is accomplished by biasing the tapping tool to a fixed neutral position with a pair of concentrically mounted, coaxial springs, one of which tends to urge the tool in a forward direction and the other of which tends to urge the tool in a rearward direction. The preload of the spring tending to advance the tool into the workpiece is selectively adjustable, thus allowing the axial thrust tending to urge the tool into the workpiece to be varied.

To provide the desired axial float in either direction, the rearmost end of the adaptor sleeve 18 has formed therein a second axial bore 45 within which is telescopically received an elongate force transmitting element 46. The element 46 is provided with a circumferential radial flange 48 at its leading end, the periphery of which acts as a bearing surface and is slidably received within the bore 45. The force transmitting element 46 is piloted in coaxial relation with respect to the adaptor sleeve 18 by the flange 48 and by an annular flange or collar 49 secured to the rear end of the sleeve 18, the inner periphery of the collar 49 serving as a second bearing surface which is slidably engaged with the force transmitting element 46. In the exemplary form of the invention, the element 46 is a hollow sleeve having a bore 50 positioned to receive and contain a resilient element, here shown as a coil spring 51. The sleeve 46 is slidably keyed to the body member 11 by a radially disposed dog point set screw 52, the end of which is received in a keyway slot 54 formed in the sleeve 46. The forward end of the spring 51 is bottomed on the base 55 of the bore 50 while the rearward end of the spring is bottomed on a plug 56 secured to the tool holding body 11 and slidably mounted within the bore 50 of the element 46. The spring 51 tends therefore to urge the force transmitting element 46 forward relative to the body member 11, thus causing the radial flange 48 to engage a corresponding radial shoulder 58 formed at the base of the bore 45 in the sleeve 18. A second spring 59, coaxial with spring 51, is concentrically mounted about the force transmitting element 46 and the opposite ends of the spring 59 are respectively bottomed against the flange 48 and the collar 49 which serve as fixed abutments on the sleeves 46, 18 respectively.

It will be apparent from the foregoing that the spring 51 tends to urge the sleeve or force transmitting element 46 in a forward direction an amount limited by abutment of the dog point set screw 52 with the rear of the keyway slot 54 (FIG. 2). Through coaction of the flange 48 on the sleeve 46 and the radial shoulder 58 on the adaptor sleeve 18, the latter, and hence the tool carrying collet 38, are biased in a forward direction. Simultaneously, the spring 59 interposed between the abutments 48, 49 tends to bias the adaptor sleeve 18 rearwardly relative to the force transmitting element 46 with the maximum amount of relative axial movement limited by engagement of the radial shoulder 58 with the flange 48. With the foregoing arrangement of components, the tapping tool 34 is resiliently retained in the positive neutral position relative to the body member 11, as shown in FIG. 2.

Figure 9:
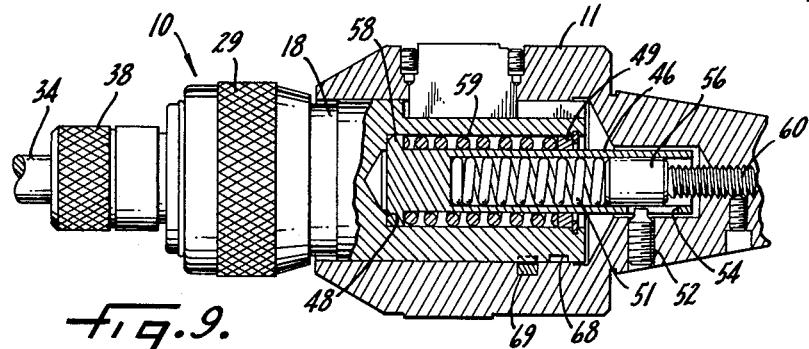
FIG. 9 is a view similar to FIG. 8 illustrating the relative positions of the components when the lead rate of the tool is less than the spindle feed rate.

Merely by way of example, let it be assumed that as the tool 34 is advanced into a workpiece, the rate of tap lead exceeds the rate of spindle feed (FIG. 8). Under such conditions, the tap is free to float forwardly in an axial direction and the spring 59 will be compressed; i.e., the tool holding device 10 will be extended or elongated in an axial direction. Conversely, should the rate of spindle feed exceed the rate of tap lead (FIG. 9), the tap 34 is free to float rearwardly relative to the body 11 as the spring 51 is compressed; i.e., the tool holding device 10 will be compacted. Under either set of conditions the tool 34 will return to the fixed positive neutral position upon completion of the tapping operation.

It will be readily apparent to those skilled in the art that since the tool 34 is axially floatable in either direction the backlash inherent in automatic machine tools will not cause damage to either the workpiece or the tap. Thus, even if the spindle is reversed and makes one or more revolutions before starting to feed out of the workpiece, the tap 34 will immediately start to feed and the spring 51 will be compressed. Stated another way, the tap 34, collet 38 and telescoped sleeves 18, 46 will all float rearwardly (FIG. 9) relative to the body member 11 which has not yet started to feed.

In carrying out the present invention, provision is made for selectively adjusting the compressive force exerted by the spring 51 so as to insure that the tapping tool 34 will properly feed into the workpiece, while at the same time insuring that the positive neutral position of the tool remains unchanged. To this end, the plug 56 abuts an axially disposed adjusting screw 60 which is threadably coupled to the body member 11 and which extends into the bore 14 at the rear end of the shank 12. When it is desired to increase the compressive force of the spring 51 the adjusting screw 60 is tightened, thus shifting the plug 56 to the left as viewed in FIG. 2. However, since the rear edge of the keyway slot 54 in the force transmitting element is in abutment with the set screw 52 (FIG. 2), the relative axial position of the sleeves 46, 18 remains unchanged and the positive neutral position of the tapping tool 34 is unaltered. Similarly if it is desired to decrease the axial thrust of the tool so as to insure that the workpiece will not be reamed out, it is merely necessary to back off the adjusting screw 60, thus allowing the plug 56 to shift axially to the right as viewed in FIG. 2 and decreasing the preload of the spring 51.

While the invention heretofore has been described in connection with a particular adjusting mechanism for shifting the plug 56 in an axial direction (i.e., an axially disposed adjusting screw 60), it will be apparent that many other arrangements can be employed and still come within the spirit and scope of the invention. For example, there is illustrated in FIG. 7 an alternative arrangement wherein the plug 56 abuts the forward end of a rearwardly extending bar 61 which is slidably mounted in an axial passage formed in the body member 11. The rearmost end of the bar 61 has formed thereon an inclined cam surface 62 which abuts a conical cam surface 64 formed on the inner end of a radially disposed adjusting screw 65. When it is desired to increase the preload of the spring 51, the adjusting screw 65 is threaded radially inward, thus camming the bar 61 to the left (FIG. 7). Conversely, when it is desired to decrease the preload of the spring 51, the adjusting screw 65 is backed off, allowing the bar 61 and the plug 56 to shift to the right under the influence of spring 51.

In accordance with another of the important aspects of the present invention, provision is made for locking out the double float feature of the tool holder 10, thus greatly increasing the versatility of the device and allowing it to be used in drilling operations or the like. To accomplish this, provision is made for releasably locking the adaptor sleeve 18 to the body member 11, thus establishing a rigid drive connection from the spindle of the automatic machine tool through the body member 11, the drive key 20, the adaptor sleeve 18, the drive keys 25 and the collet 38 to a drill (not shown) carried by the collet 38. As best illustrated in FIGS. 1, 2 and 4, the body member 11 of the tool holder 10 has formed therein a transverse passage 66 which is positioned to register with a transverse tangential slot 68 formed in the adaptor sleeve 18. A locking bar 69, having a relieved or cut-out portion 70 intermediate its ends 69a, 69b is slidably mounted in the passage 66 and held in position by means of a spring loaded detent 71 which is selectively engaged with one of two detent notches 72, 74 formed in the bar 69. The bar 69 is dimensioned so that its opposite ends 69a, 69b respectively project out of the opposite ends of the passage 66.

Referring to FIG. 4, the locking bar 69 is shown disengaged from the adaptor sleeve 18, i.e., the relieved portion 70 is registered with the sleeve 18 and the latter is free to float in either axial direction. In this condition the detent 71 is engaged with the detent notch 72. Should the user wish to use the tool holder 10 in, for example, a drilling operation where axial float is not desired, it is merely necessary to press the end 69a of the locking bar 69 and shift it laterally to the position shown in FIG. 4a with the detent 71 engaged with the detent notch 74. In this position the locking bar 69 is received within the tangential slot 68 in the adaptor sleeve 18 and relative axial movement between the sleeve and the body member 11 is inhibited. Upon completion of the drilling operation, the tool holder may be restored to the condition shown in FIG. 4 simply by pressing upon the end 69b of the locking bar and again rendering the sleeve 18 axially floatable in either direction.

Turning next to FIGS. 5 and 6, there is shown a slightly modified type of tool holding device 10′ which is somewhat similar in construction and operation to the tool holding device 10 described above and embodying the present invention. In view of the similarities between the two exemplary tool holders of the invention, like parts in both devices will be described by identical reference numerals and those parts not common to the two devices will be described by different reference numerals.

As shown particularly in FIG. 5, the tool holder 10′ includes a body member 75 having a tapered shank 12 suitable for securing the holder to a machine tool spindle in a manner identical to that theretofore described in connection with the holder 10 shown in FIGS. 1–4. In this instance however, the tap 34 is resiliently retained in a positive neutral position by means of a pair of axially spaced, coaxial springs rather than by concentric springs. Moreover, in the alternative form of the invention, one of the springs is housed within an adaptor sleeve 76 similar to the sleeve 18 while the second spring is housed within a collet 84 identical in external configuration with the collet 38. The body member 75 is here shown having an axial bore 78 positioned to slidably receive the hollow adaptor sleeve 76 with the sleeve 76 drivingly coupled to the driving body member by means of a radial drive key 79 which projects into a longitudinal keyway slot 80 formed in the sleeve 76. The arrangement is similar to that described in connection with the tool holder 10, differing therefrom primarily in that the drive key 79 is locked in place by means of a single set screw 81, and the keyway slot 80 is a "blind" slot similar to the slot 54 formed in the force transmitting element 46. Thus, the sleeve 76 is free to float in an axial direction within the limits provided by the ends of the slot 80 as the latter moves axially relative to the drive key 79. The adaptor sleeve 76 is biased to its most extended forward position by a compression spring 51 which is contained within an axial bore 82 formed in the sleeve, the spring having its opposite ends respectively bottomed against the base of the bore 82 and an axially shiftable plug 56. A tapping tool 34 is rigidly mounted on the collet 84 and the collet is releasably locked within a quick change chuck 24 fitted on the forward end of the adaptor sleeve 76.

In order to provide for axial extension of the modified tool holder 10′ when the tap lead rate exceeds the spindle feed rate, the collet 84 is formed with a rearwardly extending tubular sleeve 85 having drive flats 41 formed thereon. A plunger 86, having an enlarged head 88 with a cam surface 42 formed thereon, extends axially forward through an annular stop collar or flange 89 fixedly mounted within the tubular sleeve 84 adjacent its rearmost end. The forward end of the plunger 86 is provided with an annular flange 90. A spring 91, functionally similar to the spring 59, is interposed between the collar 89 and flange 90 which respectively serve as fixed abutments on the relatively slidable telescoped sleeve 85 and plunger 86.

Figure 10:
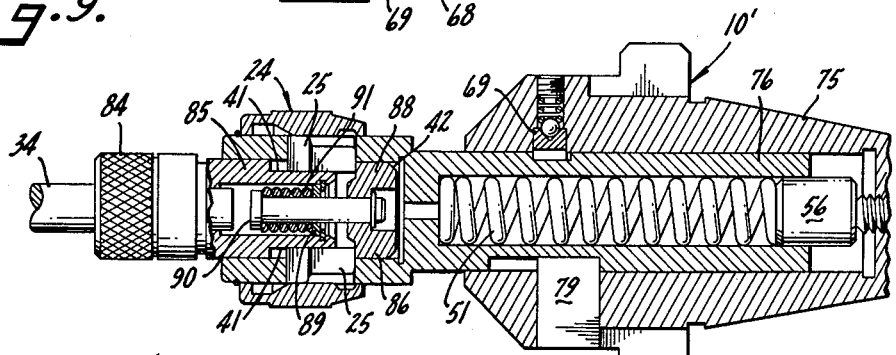
FIG. 10 is a view similar to FIG. 8 illustrating relative component positions in the tool holder shown in FIG. 5 when the tool lead rate exceeds the spindle feed rate.
Figure 11:
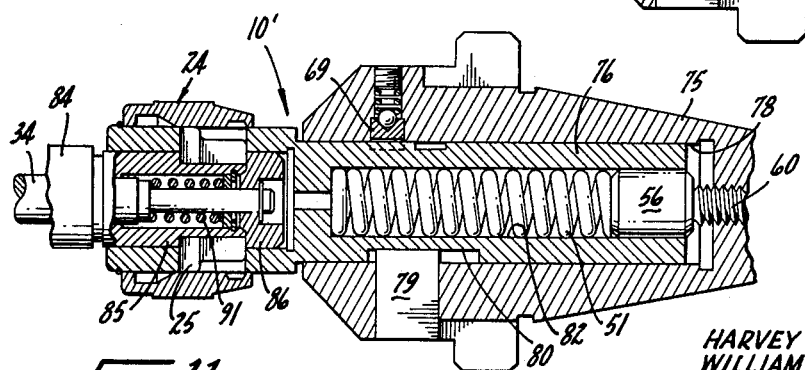
FIG. 11 is a view similar to FIG. 10 illustrating the relative component positions for the tool holder of FIG. 5 when the lead rate of the tool is less than the feed rate of the machine tool spindle.

In operation, when the rate of spindle feed exceeds the rate of tap lead (FIG. 11), the tool holder 10′ compensates for the differential axial speeds by compacting, i.e., the spring 51 yields in an axial direction. When the rate of spindle feed is less than the rate of tap lead (FIG. 10), the tool 10' compensates for the differential speeds by elongating. In this latter instance, the tap 34 and the tubular sleeve 85 of the collet 84 advance in an axial direction at a faster rate than does the plunger head 88 which is restrained from axial movement relative to the sleeve 76 by coaction with the drive keys 25, thus compressing the spring 91.

Of course, those skilled in the art will appreciate that the collet 38 shown in FIG. 2 may be identical with the collet 84 shown in FIG. 5. Thus, still further flexibility would be provided in the device 10 since the device would be capable of elongating under extreme conditions where tap lead greatly exceeds spindle feed, i.e., both springs 59 and 91 would yield.

Referring to FIG. 6, there is disclosed a locking arrangement quite similar to that employed in the preferred form of the invention shown in FIGS. 4 and 4a. However, the locking bar 69 in the modified form of the invention is provided with only one detent notch 92 which serves to normally maintain the locking bar disengaged from the adaptor sleeve 76, thus allowing the sleeve to float in either axial direction.

It will be appreciated that there has been disclosed a highly versatile and compact tool holder in which the tool is capable of floating in either axial direction relative to the drive spindle. Moreover, tool holders made in accordance with the present invention may be adjusted so that the compressive force exerted by the tool against the workpiece can be varied to insure that the tool is properly fed into the workpiece, yet wherein the neutral tap position remains unchanged relative to the drive spindle, thus allowing the device to be used with tape controlled machinery or the like. When it is desired to convert the tool holder from a double float holder to one in which no axial float is provided, it is merely necessary to press a push-button type locking bar.

We claim as our invention:

1. A tool holding device comprising, in combination, a driving body member, tool carrying means drivingly coupled to said body member with freedom for axial movement relative thereto, a fixed stop operatively associated with said body member and said carrying means for limiting axial movement of the latter, said means including a first sleeve having a bore formed therein, said means further including a second sleeve telescopically received within said bore, a first abutment positioned in said bore and axially fixed relative to said first sleeve, a second abutment formed on said second sleeve, first resilient means interposed between one of said sleeves and said body member for urging said carrier means into engagement with said fixed stop, second resilient means interposed between each of said abutments for urging said sleeves into full telescoped relationship, and means for selectively varying the force exerted by said first resilient means.

2. A tool holding device comprising, in combination, a driving body member, tool carrying means drivingly coupled to said body member with freedom for axial movement relative thereto, a fixed stop operatively associated with said body member and said carrying means for limiting axial movement of the latter, said means including a first sleeve having a bore formed therein, said means further including a second sleeve telescopically received within said bore, a first abutment positioned in said bore and axially fixed relative to said first sleeve, a second abutment formed on said second sleeve, first yieldable means interposed between one of said sleeves and said body member for urging said carrier means into engagement with said fixed stop, second yieldable means interposed between each of said abutments for urging said sleeves into full telescoped relationship, means for selectively varying the force exerted by said first yieldable means, and means for releasably locking said tool carrying means to said body member in a fixed axial position.

3. A tool holding device comprising, in combination, a driving body member, tool carrying means drivingly coupled to said body member with freedom for axial movement relative thereto, a fixed stop operatively associated with said body member and said carrying means for limiting axial movement of the latter, said means including a first sleeve having a bore formed therein, said means further including a second sleeve telescopically received within said bore, a first abutment positioned in said bore and axially fixed relative to said first sleeve, a second abutment formed on said second sleeve, a plug carried by said body member, first resilient means interposed between one of said sleeves and said plug for urging said carrier means into engagement with said fixed stop, second resilient means interposed between each of said abutments for urging said sleeves into full telescoped relationship, and means for selectively shifting said plug in an axial direction relative to said body member to vary the force exerted by said first resilient means.

4. A device for holding a tool wherein the latter has an inherent feed rate in an axial direction for a given rotational speed, said device comprising, in combination, a body member adapted to be driven rotationally and at a known feed rate in an axial direction, driven tool carrier means coupled to said body for limited axial movement relative thereto so that said carrier means is free to move at a different feed rate in an axial direction than said body member but at the same rotational speed, a fixed stop operatively associated with said body member and said carrying means for limiting axial movement of the latter, first differential motion compensating means interposed between said body member and said carrier means for biasing the latter in one axial direction into engagement with said fixed stop, said compensating means adapted to yield when the feed rate of said body member exceeds the feed rate of said driven carrier means, second differential motion compensating means interposed between said body member and said carrier means for biasing the latter in the opposite axial direction, said second compensating means adapted to yield when the feed rate of said body member is less than the feed rate of said driven carrier means, said compensating means defining a positive neutral position for said carrier means, and adjusting means for selectively varying the biasing effect of one of said compensating means, said compensating means operable to position said carrier means in the same positive neutral position for each different setting of said adjusting means.

5. A device for holding a tool wherein the latter has an inherent feed rate in an axial direction for a given rotational speed, said device comprising, in combination, a body member adapted to be driven rotationally and at a known feed rate in an axial direction, driven tool carrier means coupled to said body for limited axial movement relative thereto so that said carrier means is free to move at a different feed rate in an axial direction than said body member but at the same rotational speed, a fixed stop operatively associated with said body member and said carrying means for limiting axial movement of the latter, a first differential motion compensating spring interposed between said body member and said carrier means for biasing the latter in one axial direction, into engagement with said fixed stop, said spring adapted to yield when the feed rate of said body member exceeds the feed rate of said driven carrier means, a second differential motion compensating spring interposed between said body member and said carrier means for biasing the latter in the opposite axial direction, said second spring adapted to yield when the feed rate of said body member is less than the feed rate of said driven carrier means, said springs defining a positive neutral position for said carrier means, and adjusting means for selectively varying the biasing effect of said first differential motion compensating spring, said springs operable to position said carrier means in the same positive neutral position for each different setting of said adjusting means.

6. A device for holding a tool wherein the latter has an inherent feed rate in an axial direction for a given rotational speed, said device comprising, in combination, a body member adapted to be driven rotationally and at a known feed rate in an axial direction, driven tool carrier means coupled to said body for limited axial movement relative thereto so that said carrier means is free to move at a different feed rate in an axial direction than said body member but at the same rotational speed, a fixed stop operatively associated with said body member and said carrying means for limiting axial movement of the latter, first biasing means interposed between said body member and said carrier means for biasing the latter in one axial direction into engagement with said fixed stop, said biasing means adapted to yield when the feed rate of said body member exceeds the feed rate of said driven carrier means, second biasing means interposed between said body member and said carrier means for biasing the latter in the opposite axial direction, said second biasing means adapted to yield when the feed rate of said body member is less than the feed rate of said driven carrier means, said first and second biasing means defining a positive neutral position for said carrier means, adjusting means for selectively varying the biasing effect of said first biasing means, said first and second biasing means operable to position said carrier means in the same positive neutral position for each different setting of said adjusting means, and means for releasably locking said carrier means to said body member in a fixed axial position.

7. A device for holding a tool wherein the latter has an inherent feed rate in an axial direction for a given rotational speed, said device comprising, in combination, a body member adapted to be driven rotationally and at a known feed rate in an axial direction, driven tool carrier means coupled to said body for limited axial movement relative thereto so that said carrier means is free to move at a different feed rate in an axial direction than said body member but at the same rotational speed, a fixed stop operatively associated with said body member and said carrying means for limiting axial movement of the latter, a first differential motion compensating spring interposed between said body member and said carrier means for biasing the latter in one axial direction into engagement with said fixed stop, said spring adapted to yield when the feed rate of said body member exceeds the feed rate of said driven carrier means, a second differential motion compensating spring interposed between said body member and said carrier means for biasing the latter in the opposite axial direction, said second spring adapted to yield when the feed rate of said body member is less than the feed rate of said driven carrier means, abutment means operatively associated with said tool carrier means for limiting axial movement thereof under the influence of either of said springs, said springs defining with said abutment means a positive neutral position for said carrier means, and adjusting means for selectively varying the biasing effect of said first differential motion compensating spring, said springs operable to position said carrier means in the same positive neutral position for each different setting of said adjusting means.

8. A device for holding a tool wherein the latter has an inherent feed rate in an axial direction for a given rotational speed, said device comprising, in combination, a body member adapted to be driven rotationally and at a known feed rate in an axial direction, driven tool carrier means coupled to said body for limited axial movement relative thereto so that said carrier means is free to move at a different feed rate in an axial direction than said body member but at the same rotational speed, a plug carried by said body member, a first differential motion compensating spring interposed between said plug and said carrier means for biasing the latter in one axial direction, said spring adapted to yield when the feed rate of said body member exceeds the feed rate of said driven carrier means, a second differential motion compensating spring interposed between said body member and said carrier means for biasing the latter in the opposite axial direction, said second spring adapted to yield when the feed rate of said body member is less than the feed rate of said driven carrier means, abutment means operatively associated with said tool carrier means for limiting axial movement thereof under the influence of either of said springs, said springs defining with said abutment means a positive neutral position for said carrier means, and adjusting means for shifting said plug in an axial direction relative to said body member so as to vary the biasing effect of said first spring, said springs operable to position said carrier means in the same positive neutral position for each different setting of said adjusting means.

9. A tool holding device comprising, in combination, a body, tool supporting carrier means rotatably driven by said body, a fixed stop operatively associated with said body and said carrier means for limiting axial movement of the latter, said means including a pair of telescopically mounted sleeves, first yieldable biasing means interposed between said body and one of said sleeves for normally biasing said carrier means in one axial direction into engagement with said fixed stop, second yieldable biasing means operatively associated with each of said sleeves for normally biasing one of said sleeves in the opposite axial direction, said first and second biasing means defining a positive neutral axial position for said carrier means, and adjusting means for changing the biasing effect of one of said biasing means, said first and second biasing means operable to position said carrier means in the same positive neutral position for each possible setting of said adjusting means.

10. A tool holding device comprising, in combination, a body, tool supporting carrier means rotatably driven by said body, a fixed stop operatively associated with said body and said carrier means for limiting axial movement of the latter, said means including a pair of telescopically mounted sleeves, first spring means interposed between said body and one of said sleeves for normally biasing said carrier means in one axial direction into engagement with said fixed stop, abutment means formed on each of said sleeves, second spring means operatively associated with said abutment means for normally biasing the other of said sleeves in the opposite axial direction, said first and second springs defining with said abutment means a positive neutral axial position for said carrier means, and adjusting means for changing the biasing effect of said first spring means, said first and second spring means operable to position said carrier means in the same positive neutral position for each possible setting of said adjusting means.

11. A tool holding device comprising, in combination, a body, tool supporting carrier means rotatably driven by said body, a fixed stop operatively associated with said body and said carrier means for limiting axial movement of the latter, said means including telescopically mounted first and second sleeves, first spring means interposed between said body and said first sleeve for normally biasing said carrier means in one axial direction into engagement with said fixed stop, an outwardly extending flange formed on said first sleeve, an inwardly extending collar formed on said second sleeve, second spring means interposed between said flange and said collar for normally biasing said second sleeve in the opposite axial direction, first abutment means limiting axial movement of said first sleeve relative to said body, second abutment means limiting axial movement of said second sleeve relative to said first sleeve, said first and second springs defining with each of said abutment means a positive neutral axial position for said carrier means, and adjusting means for changing the biasing effect of said first spring means, said first and second spring means operable to position said carrier means in the same positive neutral position for each possible setting of said adjusting means.

12. A tool holding device comprising, in combination, a body, tool supporting carrier means rotatably driven by said body, said means including telescopically mounted first and second sleeves, a plug carried by said body, first spring means interposed between said plug and said first sleeve for normally biasing said carrier means in one axial direction, an outwardly extending flange formed on said first sleeve, an inwardly extending collar formed on said second sleeve, second spring means interposed between said flange and said collar for normally biasing said second sleeve in the opposite axial direction, first abutment means limiting axial movement of said first sleeve relative to said body, second abutment means limiting axial movement of said second sleeve relative to said first sleeve, said first and second springs defining with each of said abutment means a positive neutral axial position for said carrier means, and adjusting means for shifting said plug in an axial direction to vary the preload of said first spring means, said first and second spring means operable to position said carrier means in the same positive neutral position for each different axial position of said plug.

13. A tool holding device comprising, in combination, a body, a chuck carried by and drivingly coupled to said body with freedom for limited axial movement relative thereto, a fixed stop operatively associated with said body and said chuck for limiting axial movement of the latter, a collet supported by said chuck with freedom for limited axial movement relative thereto, first biasing means for resiliently biasing said chuck in one axial direction into engagement with said fixed stop, second biasing means for resiliently biasing said collet in the opposite axial direction, abutment means for limiting the amount of axial movement of said chuck and said collet so that said chuck and collet are resiliently biased to a fixed positive neutral position, and adjusting means for changing the resilient biasing effect of at least one of said first and second biasing means, said first and second biasing means operable to position said carrier in the same positive neutral position relative to said body for each setting of said adjustment means.

14. A tool holding device comprising, in combination, a body, a chuck carried by and drivingly coupled to said body with freedom for limited axial movement relative thereto, a fixed stop operatively associated with said body and said chuck for limiting axial movement of the latter, a collet supported by said chuck with freedom for limited axial movement relative thereto, first biasing means for resiliently biasing said chuck in one axial direction into engagement with said fixed stop, second biasing means for resiliently biasing said collet in the opposite axial direction, abutment means for limiting the amount of axial movement of said chuck and said collet so that said chuck and collet are resiliently biased to a fixed positive neutral position, adjusting means for changing the resilient biasing effect of said first biasing means, said first and second biasing means operable to position said carrier in the same positive neutral position relative to said body for each setting of said adjustment means, and means for releasably locking said chuck in a fixed axial position relative to said body.

15. A tool holding device comprising, in combination, a hollow driving body member, driven tool carrier means, said means including a rearwardly extending hollow sleeve slidably received within said hollow body member, means preventing relative rotation between said sleeve and said body member, an inwardly projecting substantially annular collar formed adjacent the rearmost end of said sleeve, an elongate force transmitting element slidably received within said sleeve and projecting rearwardly thereof into said hollow body member, said element having an outwardly projecting substantially annular flange in sliding engagement with the inner surface of said hollow sleeve, stop means limiting relative axial movement between said element and said body member, yieldable means interposed between said flange and said collar, a plug mounted in said body member, resilient biasing means interposed between said plug and said element for urging the latter into engagement with said stop means, said yieldable means and said resilient means operable to center said tool carrier means in a positive neutral axial position relative to said body member, and means for shifting said plug in an axial direction to vary the biasing effect of said resilient biasing means.

16. A tool holding device comprising, in combination, a hollow driving body member, driven tool carrier means, said means including a rearwardly extending hollow sleeve slidably received within said hollow body member, means preventing relative rotation between said sleeve and said body member, an inwardly projecting substantially annular collar formed adjacent the rearmost end of said sleeve, an elongate force intermitting element slidably received within said sleeve and projecting rearwardly thereof into said hollow body member, said element having an outwardly projecting substantially annular flange in sliding engagement with the inner surface of said hollow sleeve, stop means limiting relative axial movement between said element and said body member, yieldable means interposed between said flange and said collar, a plug mounted in said body member, resilient biasing means interposed between said plug and said element for urging the latter into engagement with said stop means, said yieldable means and said resilient means operable to center said tool carrier means in a positive neutral axial position relative to said body member, means for shifting said plug in an axial direction to vary the biasing effect of said resilient biasing means, and means for releasably locking said carrier means in a fixed axial position relative to said body member.

17. A tool holding device comprising, in combination, a hollow driving body member, driven tool carrier means, said means including a rearwardly extending hollow sleeve slidably received within said hollow body member, means preventing relative rotation between said sleeve and said body member, an inwardly projecting substantially annular collar formed adjacent the rearmost end of said sleeve, an elongate force transmitting element slidably received within said sleeve and having a tubular sleeve portion projecting rearwardly thereof into said hollow body member, said element having an outwardly projecting substantially annular flange in sliding engagement with the inner surface of said hollow sleeve, stop means limiting relative axial movement between said element and said body member, yieldable means interposed between said flange and said collar, a plug slidably contained within said tubular sleeve portion, adjustment means for selectively fixing the axial position of said plug relative to said body member, and resilient biasing means mounted within said tubular sleeve portion and interposed between said plug and said element, said yieldable means and said resilient means operable to center said tool carrier means in a positive neutral axial position relative to said body member.

18. A tool holding device comprising, in combination, a body member, tool supporting carrier means rotatably driven by said body member, said carrier means supported by said body member with freedom for limited axial movement relative thereto upon subjecting said means and said member to differential feed conditions, a fixed stop operatively associated with said body member and said carrier means for limiting axial movement of the latter, first resilient means for urging said carrier means in one axial direction relative to said body member and into engagement with said fixed stop, second resilient means for urging said carrier means in the opposite axial direction relative to said body member, said first and second resilient means establishing a fixed positive neutral axial position of said carrier means relative to said body member under any of diverse differential feed conditions existing between said body member and said carrier means, and means for releasably locking said carrier means to said body member in a fixed axial position.

References Cited by the Examiner

UNITED STATES PATENTS

| 2,371,330 | 3/45 | Irstad. | |
| 2,475,386 | 7/49 | Frisco | 279—16 |
| 3,113,329 | 12/63 | Andres et al. | 10—129 |

FOREIGN PATENTS 663,102  12/51  Great Britain.

ANDREW R. JUHASZ, *Primary Examiner.*